United States Patent Office 3,595,750
Patented July 27, 1971

3,595,750
PROCESS OF MAKING MAGNESIUM PHENOLIC
LAXATIVE COMPOUND
Alfred Halpern, Great Neck, and Ernest J. Sasmor,
Yonkers, N.Y., assignors to Synergistics, Yonkers, N.Y.
No Drawing. Application Dec. 3, 1968, Ser. No. 775,754,
now Patent No. 3,526,635, which is a continuation-in-
part of application Ser. No. 550,636, May 17, 1966.
Divided and this application Nov. 14, 1969, Ser. No.
871,293
Int. Cl. C12d 13/02
U.S. Cl. 195—30       7 Claims

ABSTRACT OF THE DISCLOSURE

Magnesium compounds formed from phenolic laxative compounds, phenolphthalein, dihydroxyphenolisatin, 4,4'-dihydroxy-2'-aminotriphenylmethane, and 4,4'-(2-pyridylmethylene) dihydroxydiphenyl are described, together with a method for their preparation, and pharmaceutical compositions containing the same. Methods for achieving an increased pharmacologic response of said phenolic laxative compounds through use of the magnesium ion as well as methods for achieving an improved pharmacologic and therapeutic response with the new magnesium phenolic laxative compounds and pharmaceutical compositions containing the same are included.

---

This is a division of application Ser. No. 775,754, now U.S. Pat. No. 3,526,635 filed Dec. 3, 1968 which in turn is a continuation in part of applicant's copending application, Ser. No. 550,636, filed May 17, 1966, now abandoned.

This invention relates to new and novel laxative compositions, the method for their preparation and methods for achieving a pharmacologic effect after the administration of the same to a patient. InI particular, it relates to the conversion of certain acetylated phenol laxative compounds, as for example, 4,4'-(2-pyridyl methylene) diphenoldiacetate, diacetylphenolphthalein, 4,4' - diacetoxy-2' aminotriphenylmethane, and acetphenolisatin, into a more active form by magnesium ions and the formation of the magnesium derivative of certain of these compounds, the methods for achieving said conversion and magnesium derivatives, as well as the method for achieving a superior pharmacologic effect. It is a further object of this invention to describe a method for increasing the pharmacologic response of certain phenol laxatives, as for example, phenolphthalein, dihydroxyphenylisatin, 4,4'-(2-pyridyl methylene) diphenol, and 4,4'-dihydroxy-2'-aminotriphenylmethane, through the use of the magnesium ion. Still another object of the present invention is to describe pharmaceutical compositions containing said new active substances and the method for achieving the increased pharmacologic activity by the administration of the same.

The laxative properties of certain phenol derivatives are well known. However, these agents have certain inherent limitations which restrict their therapeutic use. Such agents as 4,4' - (2 - pyridyl methylene) diphenyl diacetate, 4,4'-diacetoxy, -2' aminotriphenylmethane, acetphenylisatin and acetylphenolphthalein are useful laxative agents but require deacetylation to achieve their therapeutic effect. On the other hand, the deacetylated form exerts a stimulant action on the small intestine, thereby setting up spasms and griping. While it is known that the deacetylated form of these agents is a preferred and active form, the special protective action of the acetyl groups is necessary to protect the upper gastrointestinal tract against stimulation. Thus it is to be noted that the acetylated derivative of dihydroxyphenylisatin is essentially inert until the acetyl group has been removed to form the free phenolic derivative. Similarly, acetylated phenolphthalein is inert pharmacologically when compared with the deacetylated phenolphthalein. The compounds, 4,4'-dihydroxy-(2-pyridyl methylene) diphenoldiacetate, 4,4'-diacetoxy-2', aminotriphenyl methane, and acetphenolisation, must be protected against the deacetylation in the upper intestinal tract, in order to avoid the stimulant effects of the free form on the stomach and intestines.

While the bacterial enzymes present in the colon are capable of hydrolyzing the acetylated forms into free phenol forms, such hydrolytic conversion is subject to many vagaries and consequently the physiologic response observed will vary from a marked hyperactivity, to little or no activity. Because of the necessity for conversion into the deacetylated form before the pharmacologic effect will be observed, the onset of action varies greatly from patient to patient. This is of special concern when the products are administered rectally where the absence of a suitable medium for this conversion reactions occurs and as a result there is a wide variation of both the intensity and onset of the pharmacologic effect.

It was found that the deacetylation reaction in the colon occurs both more rapidly and completely in the presence of magnesium ions, to result in a uniform effect, which has a more rapid onset of effect than that observed with the untreated compounds. It was further found that the effect of the activated form in the presence of the magnesium ion was more rapid than the additive effects of the respective moieties and these constituted a synergistic action.

In order to accomplish the activation of these acetylated phenolic laxatives, it is necessary to use from 1/100 part to 1 part magnesium ion for each part of acetylated phenolic laxative compound. The lower limit is utilized when enzymatic degradation is intended in the colon and the upper limit is utilized when non-enzymatic deacetylation and magnesium compound formation is desired. For example, should it be desired to deacetylate these compounds in the colon, where bacterial enzymes are present, then it is necessary to use at least 1/100 part by weight of magnesium ion for each part of acetylated compound. It is important to note that this ratio of magnesium ion to active compound is independent of the amount of moisture or physiologic fluid present, although an equimolar quantity of water must be present. This activation of deacetylation reaction by colon enzymes is a direct catalytic response and not a double decomposition reaction by the magnesium ion. This may be readily demonstrated by admixing the necessary components of this reaction, to wit, 1 part acetlylphenylisatin, or 4,4'-(2-pyridyl methylene) diphenylacetate, or acetylphenolophthalein with 1/100 part by weight of magnesium ion obtained from such compounds as magnesium carbonate or bicarbonate, magnesium hydroxide, magnesium oxide, magnesium citrate, magnesium chloride, magnesium sulfate or any other pharmaceutically acceptable magnesium compound capable of yielding the sufficient quantity of the magnesium ion, and adding to this admixture an equal weight of water and an inoculum of E. Coli bacteria, an organism normally found in the human intestinal tract. The mixture is maintained at 37° C. and the formation of free acetic acid is determined periodically. When the rate of acetic acid formation, determined for the above mixture, is compared to that observed for the same components without magnesium ion, the improved effect resulting after the magnesium ion activation becomes readily apparent. The conversion into the free phenolic form proceeds rapidly and is virtually complete within 30 minutes to 1 hour, whereas a period of at least 2 hours is required for about 20 percent deacetylation in the absence of the magnesium ion.

A study of the deacetylation of acetylphenylisatin, acetylphenolphthalein, and 4,4'-(2-pyridyl methylene) diphenyldiacetate, was conducted according to the following method:

In a three-neck flask, fitted with a stirring apparatus, a condenser and an inlet tube was placed 1/100 gram molecular weight of the respective test agent, and 25 ml. of simulated intestinal juice, prepared according to U.S.P. XVII, page 1076. The mixture was stirred and warmed to 37° C. for a period of 30 minutes. Aliquot samples were removed at indicated intervals and added to a solution of 5% sulfuric acid in distilled water. The mixture was then distilled with the aid of a Kjeldahl trap to prevent liquid carry-over, and the distillate collected in distilled water. The liberated acetic acid was titrated with normal sodium hydroxide solution against the phenolphthalein as the indicator. The acetic acid determined by titration was then calculated as the milligram of acetic acid, liberated by the hydrolysis of the test compound. The test was repeated with the addition of 1/50 gram molecular weigh of magnesium ion, obtained from magnesium chloride, ti the test mixture described above, and the milligram of liberated acetic acid determined, as described above.

A third determination was conducted with the addition of 1/100 mol of magnesium ion, derived from magnesium chloride, and E. coli bacterial culture, added to the mixture described above and the liberated acetic acid determined. For each of these determinations the test compound studied was acetylphenylisatin, acetphenolphthalein and 4,4'-(2-pyridyl methylene) diphenyldiacetate.

The results obtained by the above determinations were as follows:

| Test compound | Time | Mg. of acetic acid released [1] Compound | Compound plus Mg ion | Compound plus Mg ion and E. coli, mg |
| --- | --- | --- | --- | --- |
| Acetylphenylisatin | 15 min | 35 | 150 | 205 |
| | 30 min | 57 | 850 | 960 |
| | 1 hr | 73 | 960 | 1,105 |
| Bisacodyl | 15 min | 40 | 180 | 237 |
| | 30 min | 61 | 730 | 1,005 |
| | 1 hr | 81 | 931 | 1,131 |
| Acetphenolphthalein | 15 min | 43 | 210 | 256 |
| | 30 min | 71 | 910 | 1,093 |
| | 1 hr | 93 | 1,066 | 1,183 |

[1] Determined by titration.

The theoretical maximum amount of acetic acid which could be obtained from the hydrolysis of the respective compounds was 1200 mg. based on 2 mols of acetic acid. It was found in the control determination in which the test compound alone was studied, that the extent of deacetylation for acetylhphenylsatin was 2.9% at 15 minutes; 4.8% at 30 minutes and 6.1% at 1 hour; whereas the results obtained by the same test for acetphenolphthalein were: 3.6% at 15 minutes; 5.9% at 30 minutes and 7.8% at 1 hour; and for the 4,4'-(2-pyridyl methylene) diphenyldiacetate compound the following results were obtained: at 15 minutes, 3.3%; at 30 minutes, 5.1% and at 1 hour, 6.8% of deacetylation occurred.

When 1/50 mol of magnesium ion was added the rate of hydrolysis increased significantly, so that acetylphenylisatin afforded an acetylation of: 15 minutes, 12.5%; 30 minutes, 70.8% and at 1 hour, 80%. For acetphenolphthalein the rate of hydrolysis was as follows: at 15 minutes, 17.5%; at 30 minutes 75.8% and at 1 hour, 88.8% and for 4,4'-(2-pyridyl methylene) diphenyldiacetate, the rate of hydrolysis at 15 minutes was 15%; at 30 minutes, 60.8% and at 1 hour, 77.6%.

The above rate of hydrolysis is further increased by the addition of E. coli culture, so that acetylphenylisatin resulted in a 17.1% hydrolysis after 15 minutes; 80% after 30 minutes and 92.1% after 1 hour. Acetphenolphthalein showed at 21.3% hydrolysis at 15 minutes; 91.1% at 30 minutes and 98.6% at 1 hour and 4,4'-(2-pyridyl methylene)diphenyldiacetate showed a 19.8% hydrolysis at 15 minutes; 83.8% at 30 minutes and 94.3% at 1 hour. It will be seen that after 1 hour virtually complete hydrolysis occurs with the theoretical limit of 1200 mg. being approximated.

The effect of the magnesium ion in catalyzing the deacetylation reaction has a further application when the compounds are administered orally. In this instance the magnesium ion is preferably present in amounts up to 1 part of magnesium ion for each part of acetylated phenolic compound. The deacetylated form is thereby protected throughout its passage through the upper intestinal tract and stimulation of the small intestine is avoided. As soon as the free phenolic compound is formed in the intestinal tract, the magnesium ion acts to remove this compound from solution, thereby rendering it inert until it reaches the colon. The magnesium ion was found to form a compound with the phenolic laxative compound through a bond formed between the magnesium and the hydroxy groups. The resultant magnesium-phenolic compound is stable and reproducible. The bonding between the magnesium and the phenolic laxative compound is established through a determination of the electrical conductivity of the respective magnesium-phenolic laxative compound and that of the separate components. The measurement of the specific conductance of chemical compounds demonstrates the nature of the electrical bond formed between the molecules in solution. If the specific conductance for a substance increases, so that the value for the compound is greater than the additive sum of the individual values of specific conductance determined for its separate components in solution, then this establishes that hydrogen bond formation had occurred.

The method utilized to determine the specific electrical conductance of the new magnesium-phenolic laxative compounds in solution is as follows: A known amount of the respective compounds to be measured is added to a 100 ml. of distilled water. The mixture is stirred and maintained at constant temperature (37° C.). The electrical conductance is then determined with a Wheatstone bridge. The specific conductance (L) is computed from the resistance (R) divided into the cell constant (K) and the specific conductance (L) is expressed as mhos./cm. calculated from the formula:

$$L=\frac{K}{R}=\text{mhos./cm}$$

when the electrical conductance of solutions of 0.01 molar concentrations of the respective phenolic laxative compounds, phenolphthalein, dihydroxyphenolisatin, 4,4' - dihydroxy - 2' - aminotriphenylmethane, and 4,4'-(2-pyridylmethylene)dihydroxydiphenyl were determined both before and after reaction with magnesium ion, it was found that the reaction with magnesium ion resulted in an increase in the specific conductance for the new compound which was greater than the sum of the individual conductance values for the respective separate compounds. The finding establishes that the magnesium ion forms a hydrogen bonded salt compound with the hydroxyl groups of the respective phenolic laxative compounds. (See Table I.)

The proof that the point of attachment for the magnesium in the new magnesium-phenolic laxative compound is through the hydroxyl group of the respective phenol moiety is obtained through a comparison of the respective specific conductance values for the combination of the acetylated phenolic laxative compound and the magnesium ion, with the values obtained for the combination of the magnesium ion with the deacetylated or free phenolic laxative compounds. These values are described in Table I. When the magnesium ion is added to the acetylated phenolic laxative groups, we find that there is no change in the specific conductance for the combination of substances and the value obtained is substantially that for magnesium hydroxide alone. It is noted that the acetylated compounds are essentially without any electrical conductivity. In contrast to this, the values obtained for deacetylated or free phenolic laxative compounds after combination with magnesium ion, reveals an increased specific conductance which is greater than the sum of the individual values for the respective moieties. This establishes that the point of attachment between the magnesium ion and the phenolic laxative compound is through the hydroxyl group and would appear to involve a hydrogen bond. Thus, the structure for the new magnesium-phenolic laxative compounds is established to be a magnesium salt compound of the phenolic hydroxyl groups.

rivative. This reaction is carried out in a liquid alkanol of from 1 to 4 carbons and the respective magnesium compound isolated. Another method for preparing the magnesium derivative of the respective free phenolic laxative compound is to utilize artificial intestinal juice, maintaining the pH of the medium between pH 7.5 to pH 8.5. The mixture of active reagents is incubated for a period of 6 hours at 37° C. and the respective formed magnesium derivatives of the free phenolic laxative compounds are then isolated.

When it is desired to utilize in therapy a combination of magnesium with the acetylated laxative agent, or the deacteylated laxative agent, then this may be accomplished by preparing solid dosage forms, such as powders, granules, tablets, capsules and suppositories, or liquid dosage forms such as elixis, tinctures and sirups. Through the use of this combined synergistic activity of the magnesium ion and the free phenolic compound, a lower unit dosage of the free phenolic laxative compound may be utilized to achieve the intended superior pharmacologic activity. When these new active compositions TABLE I.—THE COMPARATIVE SPECIFIC CONDUCTIVITY OF MAGNESIUM PHENOLIC LAXATIVE COMPOUNDS

| Compound | Before reaction with Mg Ion | | After combination with Mg Ion | |
|---|---|---|---|---|
| | Specific conductance | Resistance | Specific conductance | Resistance |
| Magnesium hydroxide | | | 5.82 | 2,065 |
| Phenolphthalein | 1.84 | 6,500 | 12.16 | 988 |
| Dihydroxyphenylisatin | 1.23 | 9,800 | 9.81 | 1,225 |
| 4,4'-dihydroxy-2'-aminotriphenylmethane | 0.91 | 13,200 | 8.42 | 1,441 |
| 4,4'-(2-pyridyl methylene) dihydroxydiphenyl | 0.82 | 14,700 | 7.91 | 1,520 |
| Acetylphenolphthalein | Nil | Nil | 5.40 | 2,226 |
| Diacetphenolisatin | Nil | Nil | 5.62 | 2,139 |
| 4,4'-diacetoxy-2'-aminotriphenylmethane | Nil | Nil | 5.73 | 2,098 |
| 4,4'-(2-pyridyl methylene)diphenyldiacetate | Nil | Nil | 5.61 | 2,143 |

In the colon, the magnesium ion acts to augment the laxative effect of the free phenolic form to result in a more superior effect than that obtained after either compound alone. This effect may be readily demonstrated both pharmacologically and therapeutically. The significance of the accelerated deacetylation and the protective binding of the magnesium ion with the deacetylated phenolic laxative is to provide a new and unexpected means for obtaining a uniform and improved laxative effect without causing an irritation to the intestinal tract. Furthermore, when these agents are administered via the rectal route by suppository, the presence of *E. coli* in the large intestine will facilitate a more immediate and complete deacetylation, thereby augmenting the effect of magnesium ion to result in a therapeutically more rapid onset of action, as well as a reproducible and predictable laxative effect.

The effects of the magnesium ion and *E. coli* on the rate of deacetylation could not hav ebeen predicated from either a knowledge of the chemical structure of the compounds or the prior art. The results of the present study would indicate a more rapid onset of action for the compounds containing the magnesium ion.

Furthermore, this superior laxative effect may be observed when the free phenolic forms and the magnesium ion are used directly, either by oral or rectal administration. The ratio of magnesium ion required to achieve this synergistic effect is from $\frac{1}{100}$ part to 1 part, by weight for each part of laxative compound utilized, although a range of 0.05 to 1 part of magnesium ion is preferred. It may be desired to preform the magnesium derivative of the free phenolic laxative compounds, as for example, 4,4'-(2-pyridyl methylene) diphenol, phenolphthalein, dihydroxyphenylisatin and 4,4' - dihydroxy-2' -aminotriphenylmethane, prior to its compounding into pharmaceutical dosage forms, then the respective free phenolic compound may be reacted with an equimolar portion of magnesium ion to form the respective magnesium deare administered by the rectal route in the form of suppositories, the onset of action is observed to be complete within 10 minutes after the dispersion of the suppository vehicle. The laxative effect is observed without noxious gripping and there is no local perianal irritation as is known to occur with the older preparations.

In preparing the solid dosage forms intended for oral administration, such as powders, granules, tablets and capsules, the active ingredient, that is, either the acetylated compound or the free phenolic compound is mixed with a pharmaceutically acceptable diluent, as for example, lactose, sucrose, or sorbitol, in ratio of 1 part active ingredient to from 1 to 10 parts diluent. To this is then added from 0.5 to 1 part of magnesium ion for each part of laxative compound used. The whole is then thoroughly mixed. In the preparation of capsules this mixture is then filled into gelatin capsules, so that the unit dose of the phenolic laxative moiety per capsule will be as follows:

Compound:                           Dosage, mg.
    4,4' - (2 - pyridyl methylene) diphenyl-
      diacetate _____ 5–10
    4,4'-(2-pyridyl methylene)diphenol _____ 5–10
    Diacetylphenolphthalein _____ 20–40
    Phenolphthalein _____ 20–40
    Acetphenolisatin _____ 0.5–5.0
    Dihydroxyphenylisatin _____ 0.5–2.5
    4,4'-dihydroxy-2' aminotriphenylmethane _ 10–75

The amount of magnesium ion per unit dose, that is, each capsule, is from 0.05 to 1 part by weight for each part by weight of the phenolic laxative moiety used.

When powders are desired as the dosage form, then the above mixture is subdivided into unit dosage forms, so that the range of concentration of active ingredient in each dose is identical to that of the capsules described above.

In order to prepare granules, the above mixture is passed through a Fitzpatrick granulator, utilizing 70 percent alcohol as a granulating fluid. The usual pharmaceutically acceptable binders may be added, if desired. The granules are prepared by passing through a screen having a standard mesh of between No. 6 and No. 10. The unit dosage for granules of the respective active ingredients is 1 teaspoonful for each unit dose, and is prepared so that each teaspoonful contains the unit concentration described above for capsules.

In preparing tablets the mixture prepared for the manufacture of capsules is used as the base and to this is added pharmaceutically acceptable binders, such as gum acacia and gum tragacanth and tablet lubricants, such as magnesium stearate. The mixture is then granulated, utilizing 70 percent ethanol, the mols granulation dried and then compressed into tablets, each tablet containing the same unit concentration of active materials as is present in the capsules.

When it is intended to utilize the new compositions by the rectal route, then suppositories are prepared by admixing the active ingredients with a pharmaceutically acceptable suppository base. Such suppository bases as cocoa butter, spermaceti, and the polyoxyethylene glycols, having a molecular weight of from 2000 to 6000 and which are known in commerce as "Carbowaxes" may be utilized. The unit concentration of the phenolic laxative component in each suppository is as follows:

| Compound: | Dosage, mg. |
|---|---|
| 4,4' - (2 - pyridyl methylene)diphenyldiacetate | 5–10 |
| 4,4'-(2-pyridyl methylene)diphenol | 5–10 |
| Diacetylphenolphthalein | 20–40 |
| Phenolphthalein | 20–40 |
| Acetphenolisatin | 0.5–5.0 |
| Dihydroxyphenylisatin | 0.5–2.5 |
| 4,4'-dihydroxy-2'-aminotriphenylmethane | 10–75 |

The amount of magnesium ion per unit dose, that is, each suppository, is from 0.01 to 1 part by weight for each part by weight of the phenolic laxative moiety used.

Liquid preparations are prepared by suspending or dissolving the active materials in an appropriate pharmaceutically acceptable vehicle, as for example, ethanol, glycerin, propylene glycol, polyoxyethylene glycol, water, or mixtures of these. Pharmaceutically acceptable sweeteners and coloring agents may be added, if desired. The range in concentration of the phenolic laxative component in each unit dose (5 ml.) is as described for the capsule dose form above.

When it is desired to stimulate the peristaltic activity of the colon, then the appropriate dosage form is administered to the patient by either the oral or the rectal route one or more times daily. Should it be desired to obtain the resultant physiologic response in the morning, then the selected compound in unit dosage form is administered orally at bedtime, since the intervening time required for the active ingredients to reach the colon is normally 6 to 8 hours. Because of the absence of stimulation of the small intestine, the patient will be able to sleep through the night without interruption.

When it is desired to achieve an immediate effect, then the suppository dose form is preferred and this will cause a response within a period of 15 to 30 minutes after dispersion of the suppository base. Thus, it is possible to obtain a cleansing effect of the large colon in such immediate situations as pre-operative patient preparation and prior to radiographic diagnostic procedures. A special advantage of the rectal route is the fact that no drug is introduced into the alimentary tract.

A clinical study of a subject composition, to wit, a pharmaceutical composition containing magnesium hydroxide 390 mg. and diacetylhydroxy diphenolisatin, 5 mg. in each unit dose of 2.2 gr., was found to exhibit good to excellent results in 96.1% of the patients studied. The new subject pharmaceutical composition was administered to a series of 77 post-partum patients ranging in age from 16 to 40 years, with an average age of 26.5 years, in order to control constipation during post-partum period. With few exceptions, the dosage regimen employed in the study were: 1 teaspoonful two times daily; 2 teaspoonfuls, one time daily; and 2 teaspoonfuls two times daily, administered according to the patient's needs. The duration of therapy ranged from one day's therapy through the entire hospitalization period. The new subject composition was administered at bedtime, while those patients receiving more than one dose per day were administered the medication in the morning and at bedtime. The criteria adapted to evaluate the results of the study were:

Excellent: Comfortable, satisfactory evacuation following the first day's dosage and thereafter.

Good: Comfortable, satisfactory evacuation following the second or third day's dosage and thereafter.

Poor: Unsatisfactory or no evacuation.

Clinical Results of Therapeutic Evaluation [1]

| Duration of therapy | Number of pts. | Results | | | Dosage regimens | | | |
|---|---|---|---|---|---|---|---|---|
| | | E | G | P | 1 tsp., b.i.d. | 2 tsp., o.d. | 2 tsp., b.i.d. | 1 tsp., o.d. |
| One day | 8 | 8 | | | 3 | 3 | 1 | 1 |
| Two days | [2] 9 | 5 | 4 | | 6 | | 2 | |
| Three days | 47 | 20 | 25 | 2 | 36 | | 11 | |
| Four days | 4 | 2 | 2 | | 4 | | | |
| Five days | 4 | 3 | | 1 | 3 | 1 | | |
| Six days | 1 | | 1 | | | | | 1 |
| Duration | | | | | | | | |
| Hospital stay | 4 | 4 | | | | 4 | | |
| Totals | 77 | 42 | 32 | 3 | 52 | 8 | 14 | 2 |

[1] The composition studied consisted of magnesium hydroxide, 390 mg. and diacetyldihydroxydiphenolisatin, 5 mg. in each unit dose of 2.2 grams.
[2] One patient received ½ teaspoonful o.d., excellent results. Efficacy: E+G=74, or 96.1 percent.

The results of this clinical study were as follows: 74 patients, or 96.1% of the group studied, exhibited good to excellent responses, whereas 3 patients had poor results. The side effects observed in the above study were: two cases of diarrhea, both occurring in patients who received two teaspoonfuls twice daily, with one occurrence of diarrhea taking place after two days of therapy and the other after three days of therapy. There were two occurrences of nausea observed in the entire series; one in a patient who received 1 teaspoonful, two times daily for two days, and one in a patient who received 1 teaspoonful daily for a period of six days. There was one complaint of "sick to the stomach," by a patient who had received 1 teaspoonful twice daily for a period of three days.

It is the investigator's conclusion that on the basis of this study the relative absence of side reactions together with a dramatic clinical response observed resulted in a more desirable therapeutic regimen for the patient. The relatively few failures encountered in this study are a great advantage in avoiding the use of enemas which not only tax the physical resources of the patient, but add an additional cost to the overall nursing care of the patient.

The pharmacologic and clinical properties determined for the new compound could not have been predicted from the knowledge of the scientific literature of the properties of the individual components. The clinical effects obtained were greater than would have resulted after administration of the same quantity of the individual ingredients present in the test preparation. This improved effect represents a synergistic action of the active ingredients of the preparation studied.

The following examples illustrate the scope of this invention.

EXAMPLE 1

In a glass reaction vessel is placed 0.01 mol of acetphenylisatin and 10 ml. of water. To this is added 0.01 mol of magnesium hydroxide. The mixture is stirred and inoculated with 2 ml. of a suspension of *E. coli*. The mixture is then placed in a constant-temperature bath at 37° C. Within a short period of time (10–20 minutes) the mixture will be found to contain a theoretical quantity of free acetic acid of 0.02 mol of acetic acid present in the solution. The stirring is stopped and the solvent rapidly evaporated to dryness under reduced pressure. The formed acetic acid is thereby distilled and the resultant dried powder comprises the magnesium salt of dihydroxyphenylisatin. The dried compound is extracted twice with water and anhydrous methanol, air-dried, and is compound of 94.36 percent dihydroxyphenylisatin and 7.16 percent magnesium.

EXAMPLE 2

In place of the acetphenylisatin used in Example 1 above, there may be substituted in equimolar concentration, 4,4'-(2-pyridyl methylene) diphenyldiacetate and acetylphenolphthalein. The remainder of the steps are the same and the resultant magnesium salt of 4,4'-(2-pyridyl methylene) diphenol of the magnesium salt of phenolphthalein is obtained.

EXAMPLE 3

In place of the magnesium hydroxide used in Examples 1 and 2 above, there may be substituted in equimolar quantities, magnesium oxide, magnesium carbonate, magnesium bicarbonate, magnesium chloride, magnesium sulfate, magnesium nitrate, magnesium acetate, magnesium cirtate, magnesium lactate, and magnesium succinate. The remainder of the steps being the same and the respective magnesium salt of dihydroxyphenylisatin, the magnesium salt of 4,4'-(2-pyridyl methylene) diphenol or the magnesium salt of phenolphthalein is obtained.

EXAMPLE 4

To 0.1 mol of the diacetylated form of 4,4'-(2-pyridyl methylene) diphenyldiacetate, namely, 4,4'-(2-pyridyl methylene)diphenol, dissolved in 50 ml. of ethanol, is added a solution of 0.2 mol sodium methoxide dissolved in 25 ml. of methanol. The mixture is stirred and warmed gently. A solution of 0.1 mol of magnesium chloride, dissolved in 25 ml. of methanol, is added slowly while stirring. A precipitate of sodium chloride forms. After 1 hour of stirring, while the compound is maintained at about 45–50° C., the stirring is stopped and the mixture cooled to room temperature. An equal volume of water is added and the solution filtered. The insoluble material is washed several times with cold water and consists of the magnesium enolate of 4,4'-(2-pyridyl methylene) diphenol. The compound does not melt below 300° C. and is insoluble in water. The compound contains 8.24 percent of magnesium (theory 8.12 percent).

EXAMPLE 5

In place of the 4,4'-(2-pyridyl methylene) diphenol used in Example 4 above, there may be substituted in equimolar quantities, dihydroxydiphenylisatin, phenolphthalein and 4,4' dihydroxy-2'-aminotriphenylmethane. The remainder of the steps are the same and the respective magnesium salt of dihydroxydiphenylisatin, the magnesium salt of phenolphthalein and the magnesium salt of 4,4' dihydroxy-2'-aminotriphenylmethane are obtained.

EXAMPLE 6

In place of the sodium methoxide used in Examples 4 and 5 above, there may be substituted any alkaline agent capable of raising the pH of the reaction medium to between pH 7.5 and pH 10. The exact amount of the alkali to be used will depend on the particular basic strength of the compound used. The remainder of the steps in this reaction are the same as those described in Examples 4 and 5 and the products obtained as a result of Examples 4 and 5 will be obtained.

EXAMPLE 7

To 200 cc. of artificial intestinal juice prepared accordingly to the procedure described in the United States Pharmacopeia XVII, is added 0.01 mol of acetphenylisatin and 0.01 mol of magnesium carbonate. The mixture is stirred and incubated for a period of 6 hours at 37° C. At the end of this time the mixture is centifuged and the supernatant liquid discarded. The solid residue is extracted with water and centrifuged. The supernatant fluid is discarded and the solid residue is dried and is the magnesium salt of dihydroxydiphenylisatin.

EXAMPLE 8

In place of the acetphenylisatin used in Example 7 above, there may be substituted in equimolar quantities. acetphenolphthalein and 4,4'-(2-pyridyl methylene) diphenyldiacetate. The remainder of the steps being the same and the respective magnesium salt of phenolphthalein and the magnesium salt of 4,4'-(2-pyridyl methylene) diphenol will be obtained.

EXAMPLE 9

When it is desired to utilize the magnesium-phenolphthalein, magnesium-dihydroxydiphenylisatin, magnesium-4,4'-(2-pyridyl methylene diphenol and magnesium-4,4' dihydroxy-2'-aminotriphenylmethane, in therapy, then this may be accomplished by preparing solid dosage forms such as powders, granules, capsules, tablets or suppositories or liquid dosage forms, such as elixirs, tinctures or sirups. The concentration of the respective phenol laxative moiety in the unit dosage form is as follows:

| Compound: | Dosage, mg. |
|---|---|
| 4,4' - (2 - pyridyl methylene) diphenyldiacetate | 5–10 |
| 4,4'-(2-pyridyl methylene) diphenol | 5–10 |
| Diacetylphenolphthalein | 20–40 |
| Phenolphthalein | 20–40 |
| Acetophenolisatin | 0.5–5.0 |
| Dihydroxyphenylisatin | 0.5–2.5 |
| 4,4'-dihydroxy-2'-aminotriphenylmethane | 10–75 |

The concentration of magnesium ion in each unit dosage form is at least 0.01 part by weight of the quantity of phenolic laxative compound used.

When the oral route of administration is preferred, then both solid and liquid pharmaceutical preparations may be utilized. In preparing tablets containing the new magnesium derivatives of the phenolic laxative compounds, the appropriate quantity of either the acetylated form or free phenolic compounds is mixed with an equal weight of the selected magnesium compound, as for example, those magnesium compounds described in Example 3 above. To this mixture is added a pharmaceutically acceptable diluent, such as lactose, sucrose, dextrose or starch, in ratio of 1 part by weight of active materials to from 1 to 20 parts by weight of diluent. The whole is then mixed and wetted with a solution of 40 percent aqueous ethanol. The wet mixture is then passed through a granulating screen and then air-dried. A binding agent such as gum acacia or gum tragacanth is added in concentration of 0.1 to 0.5 percent by weight and the mixture regranulated with the same granulating solution, to wit, 40 percent aqueous ethanol. The wet granulation is passed through a suitable screen and then air-dried and compressed into tablets of suitable size and shape, so that each tablet contains the following concentration of active ingredient:

| Compound: | Dosage, mg. |
| --- | --- |
| 4,4' - (2 - pyridyl methylene) diphenylacetate | 5–10 |
| 4,4'-(2-pyridyl methylene) diphenol | 5–10 |
| Diacetylphenolphthalein | 20–40 |
| Phenolphthalein | 20–40 |
| Acetphenolisatin | 0.5–5.0 |
| Dihydroxyphenylisatin | 0.5–2.5 |
| 4,4'-dihydroxy-2'-aminotriphenylmethane | 10–75 |

The concentration of magnesium ion in each tablet is at least 0.01 to 1 part by weight of the amount of phenolic laxative compound present, although a ratio of from 0.05 to 1 part by weight of magnesium ion for each part of phenolic laxative compound is preferred.

Should capsules be desired, then the mixture of active ingredients together with the diluent as prepared for the tablets, may be filled directly into gelatin capsules of suitable size and shape. The unit dosage concentration of the active ingredients in each capsule is the same as that described for each tablet. The granulation which is utilized for the preparation of the capsules may also be utilized in the preparation of powders. In this instance, however, the ratio of the diluent to the active ingredient is from 1 part diluent for each part active ingredient to 100 parts of diluent for each part of active ingredient.

For the preparation of granules the tablet granulation described above may be utilized and this is passed through a No. 8 standard mesh screen to obtain a uniform particle size. The concentration of active ingredient in each unit dose (1 teaspoonful) of granules is that same as that described for the tablets.

Should a liquid dosage form be desired, then the selected active ingredient is dissolved or suspended in a pharmaceutically acceptable solvent, consisting of sorbitol, ethanol, glycerin, propylene glycol, polyoxethylene glycol, water or mixtures of these, in sufficient quantity so that each unit dose (1 teaspoonful) (5 ml.) will contain the following concentration of active ingredient:

| Compound: | Dosage, mg. |
| --- | --- |
| 4,4' - (2 - pyridyl methylene) diphenyldiacetate | 5–10 |
| 4,4'-(2-pyridyl methylene) diphenyl | 5–10 |
| Diacetylphenolphthalein | 20–40 |
| Phenolphthalein | 20–40 |
| Acetphenolisatin | 0.5–5.0 |
| Dihydroxyphenylisatin | 0.5–2.5 |
| 4,4'-dihydroxy-2' aminotriphenylmethane | 10–75 |

The concentration of magnesium ion for each unit dose (1 teaspoonful 5 ml.) is at least 0.01 to 1 part by weight of the amount of phenolic laxative compound present, although a ratio of from 0.05 to 1 part by weight of magnesium ion for each part of phenolic laxative compound is preferred. Suitable pharmaceutically acceptable sweeteners and coloring agents may be added if desired.

EXAMPLE 10

Should it be desired to obtain a more rapid effect, than suppositories administered via the rectal route are preferred. In order to prepare suppositories the selected active ingredient, which may be the acetylated or free phenolic laxative compound is mixed with from 0.01 to 1 part by weight of a magnesium compound as described in Example 3 above and the mixture dispersed in a pharmaceutically acceptable suppository base. The dispersion of active ingredient may be accomplished by levigation or suspension in the molten suppository vehicle. Suitable pharmaceutically acceptable suppository bases are cocoa butter, spermaceti and the solid polyoxyethylene glycol compounds having a molecular weight of from 2000 to 6000 and which are known in the trade as "Carbowax" compounds, or mixtures of these. The suppositories are molded into desired size and shape so that each suppository contains the following concentration of active ingredients:

| Compound: | Dosage, mg. |
| --- | --- |
| 4,4' - (2 - pyridyl methylene) diphenyldiacetate | 5–10 |
| 4,4'-(2-pyridyl methylene) diphenol | 5–10 |
| Diacetylphenolphthalein | 20–40 |
| Phenolphthalein | 20–40 |
| Acetphenolisatin | 0.5–5.0 |
| Dihydroxyphenylisatin | 0.5–2.5 |
| 4,4'-dihydroxy-2' aminotriphenylmethane | 10–75 |

The concentration of magnesium ion for each suppository is at least 0.01 to 1 part by weight of the amount of phenolic laxative compound present.

EXAMPLE 11

In place of the active ingredients described in Examples 9 and 10 above, there may be substituted in equimolar quantities the preformed magnesium salt of 4,4'-(2-pyridyl methylene) diphenol, the magnesium salt of phenolphthalein, the magnesium salt of dihydroxyphenylisatin, or the magnesium salt of 4,4'-dihydroxy-2'-aminotriphenylmethane. The remainder of the steps are the same for the preparation of the respective pharmaceutical dosage forms described in Examples 9 and 10. The concentration of active ingredient per unit dosage form is also the same for the preformed compound as that described for the respective unit dosage forms of Examples 9 and 10.

EXAMPLE 12

When it is desired to obtain an increased peristaltic stimulation, the unit dosage form of the selected active compound as described in Examples 9, 10 and 11, may be administered, one or more times daily depending upon the patient's needs. A patient who is suffering from refractory constipation may require a repeated administration of the unit dose of the active ingredients, in contrast to the patient complaining of functional constipation. A laxative effect will be observed after a period of 6 hours when the preparation is administered orally which is the intervening time necessary for the active component to reach the large bowel. When a more rapid laxative effect is desired, then suppository medication is preferred and the laxative effect will be observed within a period of 10 minutes after dispersion of the suppository base. The laxative effect will be achieved without griping or stimulation of the upper intestinal tract.

EXAMPLE 13

In place of the water used as a vehicle in Examples 1, 2 and 3 above, there may be substituted in equal amounts artificial intestinal juice or normal saline solution. The remainder of the steps are the same and the compounds resulting are the same as described in said examples.

EXAMPLE 14

In place of the magnesium salt utilized in examples 7 and 8 above, there may be substituted in equimolar quantities, magnesium hydroxide, magnesium oxide, magnesium bicarbonate, magnesium chloride, magnesium sulfate, magnesium nitrate, magnesium acetate, magnesium citrate, magnesium lactate and magnesium succinate. The remainder of the steps being the same and the respective magnesium compound of dihydroxydiphenylisatin, 4,4'-(2 - pyridyl methylene) dihydroxydiphenyl, phenolphthalein and 4,4' - dihydroxy-2'-aminotriphenylmethane will be obtained.

What is claimed is:

1. The method of preparing a magnesium phenolic compound which comprises the steps of dispersing a first compound selected from the group consisting of 4,4′-diacetoxy-2′-aminotriphenylmethane, 4,4′-(2-pyridyl methylene) diphenyl-diacetate, diacetylphenolphthalein, and acetphenolisatin, in intestinal juice, adding at least a molar equivalent quantity of magnesium ion, stirring the mixture, warming said mixture to 37° C., distilling the liquid phase and recovering the respective formed magnesium salt of dihydroxyphenylisatin, magnesium salt of 4,4′-(2-pyridyl methylene) diphenol, magnesium salt of phenolphthalein and magnesium salt of 4,4′-dihydroxy-2′-aminotriphenylmethane therefrom.

2. The method of preparing a magnesium phenolic which comprises the steps of dispersing a first compound selected from the group consisting of 4,4′-(2-pyridyl methylene) diphenyldiacetate, 4,4′-diacetoxy-2′-aminotriphenylmethane, diacetylphenolphthalein and acetphenolisatin in intestinal juice, adding a molar equivalent quantity of magnesium ion, stirring the mixture, adding a suspension of E. coli bacteria, incubating said mixture at 37° C., distilling the liquid phase and recovering the respective formed magnesium salt of dihydroxyphenylisatin, magnesium salt of 4,4′-(2-pyridyl methylene) diphenol, magnesium salt of 4,4′-dihydroxy-2′-aminotriphenylmethane, and magnesium salt of phenol-magnesium salt of 4,4′-dihydroxy-2′-aminotriphenylmethane, and magnesium salt of phenolphthalein therefrom.

3. The method of claim 2, said first compound being acetphenolisatin and said formed product being the magnesium salt of dihydroxyphenolisatin.

4. The method of claim 2, said first compound being 4,4′-(2-pyridylmethylene)diphenyldiacetate and said formed product being the magnesium salt of 4,4′-(2-pyridyl methylene) diphenol.

5. The method of claim 2, said first compound being acetphenolphthalein and said formed products being the magnsium salt of phenolphthalein.

6. The method of claim 2, said first compound being 4,4′-diacetoxy-2′-aminotriphenolmethane and said formed product being the magnesium salt of 4,4′-dihydroxy-2′-aminotriphenolmethane.

7. The method of claim 6, said first compound being phenolphthalein.

References Cited

UNITED STATES PATENTS 3,331,862  7/1967  Merrill et al. _____ 260—396

LIONEL M. SHAPIRO, Primary Examiner

U.S. Cl. X.R.

195—29